Dec. 1, 1959  B. BARÉNYI  2,915,334
DEVICE FOR LIFTING OR LOADING AUTOMOBILES
Filed May 23, 1955

INVENTOR
BELA BARENYI
BY Dicke and Craig.
ATTORNEYS

United States Patent Office 2,915,334
Patented Dec. 1, 1959

2,915,334
DEVICE FOR LIFTING OR LOADING AUTOMOBILES

Béla Barényi, Stuttgart-Hohenheim, Germany

Application May 23, 1955, Serial No. 510,262
In Germany January 22, 1949

Public Law 619, August 23, 1954
Patent expires January 22, 1969

10 Claims. (Cl. 296—28)

The present invention relates to devices for loading or towing motor vehicles.

Generally speaking, automobiles and similar vehicles are not provided with any equipment for loading or stowing the same by means of a crane or the like. Thus, if such a car is to be readied for shipment overseas, loaded on a truck or flat car, or hitched up by a car or wrecking truck, ropes are usually wound around the entire car or one end thereof; these ropes are then hooked on the crane hook and the car is then picked up partly or entirely. Scratches or even more serious damage to the car are practically unavoidable when utilizing such loading method.

It is the principal object of the present invention to eliminate such makeshift arrangements with all their disadvantages and to provide a loading or stowing device for automobiles and similar vehicles, and especially those which have a box-type frame consisting of longitudinal arms or runners which are interconnected by a pair of crossbars limiting the extent of the inside compartment of the car body toward the front and rear. Such longitudinal runners are preferably, although not necessarily, disposed outside of the wheels.

Another object of the present invention is to provide a device which facilitates the suspension of a car either wholly or partly, on a hauling rope, cable, or the like without any danger that the car may be dented, rubbed, or scratched by such rope or cable.

A further object of the present invention is to provide a device which is especially adapted for connecting a hauling rope thereto and to be mounted on the points of intersection between the longitudinal and transverse arms of the frame. Such points are capable of withstanding maximum stresses and are therefore very suitable for the purposes of the invention.

A feature of the present invention in its simplest form consists in the provision of a flange or bracket which is secured to the lower side of a crossarm at its point of intersection with one of the longitudinal runners and extends downwardly through the bottom of the car body, and which on its projecting portion carries a strong suspension eye or the like for connecting a hauling rope thereto.

Another feature of the invention consists in providing an opening in the outer side wall of the longitudinal runner at a point coaxial with the crossarm, and to insert a hook or one free end of an S-shaped arm therein, while the other end of such arm which is pointing in the direction in which the traction is to be applied for lifting, dragging, or stowing the car is provided with a suspension eye or similar device.

Additional devices suitable for the purposes of the invention may be provided on the inside of the crossarm.

Further objects, features, and advantages of the present invention will be apparent from the following detailed description as well as from the accompanying drawings, in which—

Figure 2:
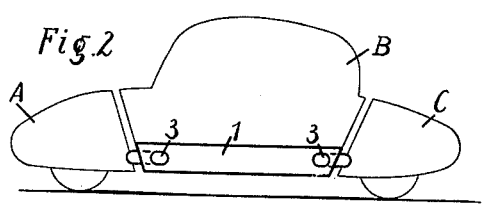
Fig. 2 shows a side view.
Figure 1:
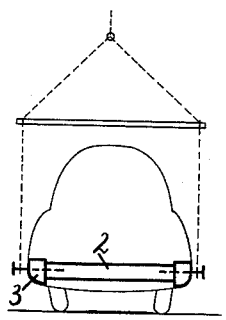
Fig. 1 shows a diagrammatic end view of an automobile designed according to the cellular system of construction with a frame structure which is especially adapted for the purposes of the invention.
Figure 3:
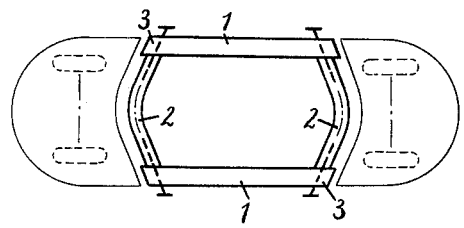
Figure 4:
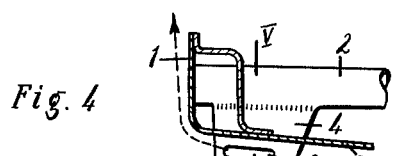
Figure 5:
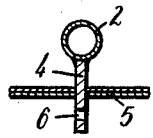
Figure 8:
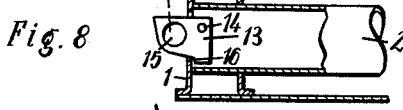
Figure 9:
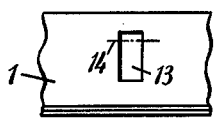
Figure 6:
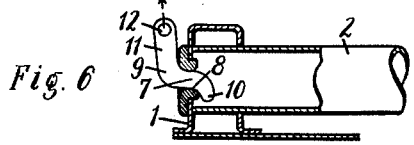
Figure 7:
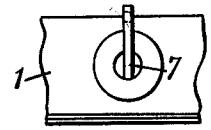
Figure 10:
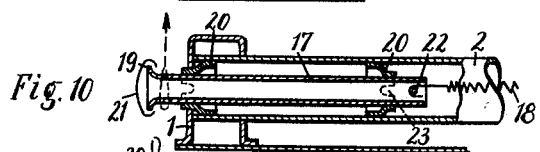
Figure 11:
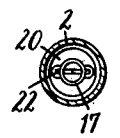
Figure 12:
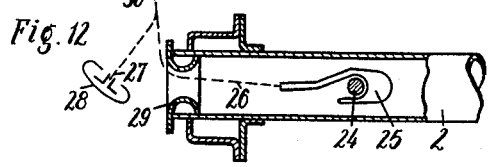
Figure 13:

Fig. 3, a top view thereof;

Figs. 4 and 5, respectively, show an enlarged side and end view, partly in section, of the joint between the longitudinal runner and the crossarm according to one embodiment of the invention;

Figs. 6 and 7, respectively, show similar views of a modification of the invention;

Figs. 8 and 9, respectively, show similar views of another modification;

Figs. 10 and 11, respectively, show similar views of the embodiment of the invention as indicated in Figs. 1 to 3; while Figs. 12 and 13, respectively, show similar views of still another embodiment of the invention.

Referring to the drawings, the present invention is illustrated in Figs. 1 to 3 as being applied to an automobile built according to the cellular system of construction and consisting of the cells A, B, and C with a frame which is particularly suitable for the purposes of the invention. Although shown as applied to such particular type of car, the present invention is not at all limited thereto. Such frame consists of the longitudinal arms or runners 1 which are interconnected by crossarms 2 which limit the extent of the passenger compartment of the car body toward the front and rear, and in this case the cell B as well. The width of the frame is preferably made larger than the wheel track, although this also does not constitute a necessary requirement of the invention. The joints 3 between the longitudinal runners 1 and crossarms 2 are indicated as being provided with the anchoring device for a rope or the like according to the invention, details of which are more specifically illustrated in several different embodiments in Figs. 4 to 13.

In Figs. 4 and 5, one of these joints is shown as being provided with a bracket 4 secured to the lower side of the crossarm member 2 and within the area of the intersection thereof with one of the runners 1. The longitudinal arm or runner 1 comprises inner and outer walls as seen in Figure 4, the cross member 2 extending through the inner wall into abutting engagement with the outer wall. The bracket 4 is of relatively heavier material than that of this outer wall and is supportingly engaged by the cross member 2 as by being welded thereto at points both inwardly and outwardly of the inner wall of the longitudinal arm 1 relative to the center of the car. Such bracket 4 projects downwardly through the bottom panel of the body of the car 5, the panel extending beneath the respective junction of the longitudinal runner 1 and the cross arm 2. The projecting end of the bracket 4 is provided with a sling-engaging eye 6 into which a hauling rope may be inserted or hooked. The lower portion of the bracket 4 projects outwardly of the vehicle body in a downward direction and lies within the periphery of the vehicle body as seen in plan so that there are no laterally projecting obtrusions when the bracket is not in use.

While the embodiment as shown in Figs. 4 and 5 is essentially independent of the shape and construction of the runners 1 and crossarms 2 of the frame, the embodiment shown in Figs. 6 and 7 requires, at least within the area of the joint, the frame members 1 and 2 to be of hollow or tubular shape. The outer wall of the runner 1 in the direction of the longitudinal axis of the crossarm 2 is provided with an aperture 7, the edge portions 8 of which are preferably reinforced by having an annular plate or the like welded thereto. One end 10 of an S-shaped arm 9 is inserted into the aperture 7 while the other end 11 of such arm is provided with a suspension eye 12. When a traction is applied on the end 11 in the direction as illustrated by the arrow in Fig. 6, arm 9 will clamp or grip the walls of the aperture 7 so as not to be disengaged therefrom.

The further embodiments of the invention illustrated in the drawings show the rope suspension device according to the invention mounted at the inside of the tubular crossarm 2 and adapted to be moved into its operative position through a hole or slot in the outer wall of the longitudinal runner 1.

Thus, Figs. 8 and 9 show a flat segment-shaped plate 13 which is pivotally mounted within the crossarm 2 about a horizontal pivot 14 so as to be extendable through a slot provided at the joint between the runner 1 and the crossarm 2. When pivoted outwardly, segment 13 is arrested in the position shown in Fig. 8 by a lug 16 which engages with the lower edge of the slot, and the suspension eye 15 will then be in the position in which a hauling rope may be passed therethrough or hooked therein. When the segment is pivoted inwardly, the slot will be substantially closed thereby and unnoticeable from the outside.

Figs. 10 and 11 show the details of construction of the embodiment of the invention applied in Figs. 1 to 3. A bolt 17 extends into the inside of the tubular crossarm 2 and a tension spring 18 is connected to the inner end thereof. For supporting engagement with the cross member 2, the bolt 17 is slidably mounted in guide elements 20 secured to the inner wall of the tubular crossarm 2 or to the edge portion forming the joint between the crossarm 2 and the longitudinal runner 1, respectively. The inner guide element 20 is supported by the cross arm 2 inwardly of the inner wall of the longitudinal runner 1. When in its inoperative position, bolt 17 is drawn inwardly by the spring 18 and its head 19 abuts against the frame 1 so as hardly to be noticeable, and such head may further be covered by a cap 21. For suspending a rope or the like on the bolt 17, the latter is pulled out against the action of spring 18, whereupon the rope is wound around or hooked on the bolt 17 behind the head 19 and thus prevented from coming off.

In order to prevent the bolt 17 from being pulled out too far or even entirely, a crosspin 22 is inserted therein. The guide elements 20 have slots 23 therein which permit the passage of crosspin 22 when bolt 17 is being inserted. Thereafter, bolt 17 is turned slightly so that the position of slots 23 no longer coincides with that of the pin 22 and the bolt is secured from being withdrawn too far.

Figs. 12 and 13 finally show a device according to the invention in which a bolt 24 is passed through the crossarm 2 near the joint thereof with the runner 1. This bolt 24 may be secured to the tubular crossarm 2 either by being screwed therein or welded thereto. A hook or eye 25 on the end of a cable 26 may then be inserted into the tubular end of the crossarm 2 and hooked over the bolt 24. The other end 27 of this cable 26 is secured to the inside of a cap 28 which is adapted to open or close the outer opening 29 in the longitudinal runner 1 which is preferably reinforced by a flange which is welded thereto. An eye or loop 30 is formed in the cable 26 near the end 27 thereof and adapted for passing a rope therethrough or for suspending a hook or the end of such rope therein. When not in use, the entire length of the cable 26 may be hidden within the tubular end of the crossarm 2, and the opening 29 may be fully closed by the cap 28. This embodiment of the invention also has the advantage of being practically unnoticeable and very simple, apart from the fact that the rope or at least a part thereof may be stored therein.

Obviously, in place of an eye in the outer end of the device, any other suitable device, such as a snap hook or the like may be provided thereon for easy engagement with a stowing cable or rope.

Also, in any of the embodiments, the hauling rope, chain, bar or the like may be stored in a suitable opening in the hollow longitudinal or transverse arms of the frame.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. In combination with a motor vehicle having front and rear axles, a vehicle body including a box-type frame comprising a pair of longitudinal arms and a pair of cross members connecting said longitudinal arms within the extent thereof between said front and rear axles by means of joints located at opposite ends of each cross member, a plurality of sling attaching anchor means for lifting the vehicle secured to said frame at the oppositely disposed joints of said cross members within the extent between said axles, said longitudinal arms of said frame having spaced inner and outer walls at said joints, the cross member at at least one of said joints extending through said inner wall and having an end portion abutting the outer wall, the anchor means at each of said last-mentioned joints being supportingly engaged with said cross member at least at a point inwardly of said inner wall and comprising a sling attaching portion projecting outwardly from the body for facilitating the attachment thereto of rope slings or the like for lifting the vehicle upwardly, said projecting portions when not in use being disposed inwardly of the periphery of the vehicle as seen in plan, said vehicle body comprising a bottom panel extending beneath each of said last-mentioned joints.

2. A combination as defined in claim 1, wherein each of said anchor means comprises a bracket member, each said bracket member being of relatively heavier material than that of the outer wall of the longitudinal arm and being mounted on the lower side of a respective cross member and extending downwardly through the bottom panel of said vehicle, each said bracket member having an aperture in its lower end adapted for having a rope or the like inserted therein.

3. In combination with a motor vehicle having front and rear axles, a box-type frame comprising a pair of longitudinal arms and a pair of crossarms connecting said longitudinal arms within the extent thereof between said front and rear axles by means of joints located at opposite ends of each crossarm, and suspension means mounted at the oppositely disposed joints of said crossarms within the extent between said front and rear axles for attaching thereto a rope or the like for loading said vehicle by lifting the same upwardly, an outer side wall of said longitudinal arm having an opening therein at the joint thereof with said crossarm and at a point substantially coaxially with said crossarm, means for reinforcing the edge portions surrounding said opening, said suspension means comprising an S-shaped arm, one free end of said arm being adapted to be inserted into said opening, and the other end of said arm when inserted into said opening pointing in a direction in which a traction may be applied thereon and having an opening therein adapted for inserting a rope or the like therein.

4. In combination with a motor vehicle having front and rear axles, a box-type frame comprising a pair of longitudinal arms and a pair of crossarms connecting said longitudinal arms within the extent thereof between said front and rear axles by means of joints located at opposite ends of each cross arm, and means including a suspension member mounted at the oppositely disposed joints of said cross arms within the extent between said front and rear axles for attaching thereto a rope or the like for loading said vehicle by lifting the same upwardly, said crossarm including a hollow portion at least adjacent to its joint with said longitudinal arm, said joint having an aperture therein toward the outside of said frame, said suspension member when in the inoperative position being disposed at least partially within said hollow portion and at least one portion of said member extending through said aperture toward the outside of said joint in the operative position thereof.

5. A combination according to claim 4, wherein said suspension member is movable in said aperture and including spring means for biasing said member inwardly of said hollow portion.

6. A combination as defined in claim 4, wherein said aperture in said joint forms a slot, said suspension member being of segmental shape and pivotally mounted within said crossarm near said joint so as to be pivotable within, and laterally guided by the sides of said slot when being pivoted toward the outside, and a stop member on said suspension member for limiting its outward pivoting movement.

7. A combination as defined in claim 4, wherein said suspension member when moved inwardly substantially closes said aperture toward the outside.

8. A combination as defined in claim 4, wherein said suspension member comprises a bolt mounted within said aperture and said hollow portion of said crossarm, and being guided therein for sliding movement inwardly and outwardly of said crossarm, said bolt having an enlarged head on its outer end, and a spring connected to the inner end of said bolt and tending to draw said bolt up to its head into said hollow portion, said head then being adapted to close said aperture toward the outside.

9. A combination as defined in claim 8, further comprising guide members within said crossarm for supporting said bolt for sliding movement therein, a crosspin in said bolt adapted to act as a stop member to prevent excessive withdrawal of said bolt toward the outside, said guide members having slots therein adapted to permit said crosspin to pass therethrough when said bolt is being inserted into said crossarm and through said guide members, said crosspin being incapable of passing through said slots when said bolt is slightly turned about its axis after being fully inserted and then serving as a stop member.

10. A combination as defined in claim 4, wherein said suspension member comprises a bolt mounted within said hollow portion of said crossarm and extending transversely thereto, and a cable connected to said transverse bolt and adapted to be stored in said hollow portion when in inoperative position, the free end of said cable having an eye and adapted to be withdrawn from said hollow portion for having a rope or the like inserted therein, and a cap connected to said cable and adapted to be placed on said aperture to close the same when said cable is stored within said hollow portion.

References Cited in the file of this patent

UNITED STATES PATENTS

| | | |
|---|---|---|
| 1,313,429 | Lenfesty | Aug. 19, 1919 |
| 1,599,535 | Klotz | Sept. 14, 1926 |
| 1,657,076 | Fitch | Jan. 24, 1928 |
| 1,940,556 | Miller | Dec. 19, 1933 |
| 2,256,885 | Bruss | Sept. 23, 1941 |
| 2,341,883 | Sloan | Feb. 15, 1944 |
| 2,358,446 | Couse | Sept. 19, 1944 |
| 2,551,528 | Darrin | May 1, 1951 |
| 2,593,664 | Fearfield et al. | Apr. 22, 1952 |
| 2,720,324 | Cosentino | Oct. 11, 1955 |

FOREIGN PATENTS

| | | |
|---|---|---|
| 601,189 | Germany | Aug. 10, 1934 |